United States Patent [19]

Bellman et al.

[11] Patent Number: 4,572,611

[45] Date of Patent: Feb. 25, 1986

[54] APPARATUS INCLUDING AN INTEGRAL OPTICAL DEVICE

[75] Inventors: Robert H. Bellman, Catlin; Nicholas F. Borrelli, Elmira; David L. Morse; Paul A. Sachenik, both of Corning, all of N.Y.

[73] Assignee: Corning Glass Works, Corning, N.Y.

[21] Appl. No.: 697,957

[22] Filed: Feb. 4, 1985

Related U.S. Application Data

[63] Continuation-in-part of Ser. No. 520,456, Aug. 4, 1983, abandoned.

[51] Int. Cl.[4] .............. G02B 1/00; G02B 27/00; C03C 23/00; B29C 27/00
[52] U.S. Cl. .............................. 350/167; 65/33; 65/111; 156/84; 350/417; 428/426; 430/295; 430/322
[58] Field of Search ........... 65/30.1, 30.13, 30.14, 65/31, 33, 111; 156/84, 85, 86; 350/167, 417; 428/212, 218, 426, 428; 430/295, 322, 325, 328

[56] References Cited

U.S. PATENT DOCUMENTS 2,628,160  2/1953  Stoohey .......................... 65/111
4,013,465  3/1977  Clapham et al. ................ 430/322

Primary Examiner—John K. Corbin
Assistant Examiner—William Propp
Attorney, Agent, or Firm—C. S. Janes, Jr.

[57] ABSTRACT

An optical apparatus for focusing at least one image and optionally only one image of an object, said apparatus comprising a receiving surface and an optical imaging device between the image and the object to form an image of the object on the receiving surface. The imaging device comprising at least one glass body, at least a portion of which is a photonucleated opacified glass. The body has opposed surfaces, at least one of the surfaces having raised light focusing transparent optical pattern portions integral therewith and transparent channels connecting the raised transparent pattern portions to the surface opposed to the surface containing the pattern.

The invention further comprises a method for focusing an image of an object on a receiving surface which comprises interposing an optical imaging device between the object and the surface to form an image of the object on the surface, said optical imaging device comprising a glass body at least a portion of which is a photonucleated opacified glass, said body having opposed surfaces, at least one of the surfaces having light focusing raised transparent optical pattern portions integral therewith, and transparent channels connecting said raised pattern portions to the surface opposed to the surface containing said pattern.

41 Claims, 10 Drawing Figures

APPARATUS INCLUDING AN INTEGRAL OPTICAL DEVICE

This is a continuation-in-part of copending application Ser. No. 520,456, filed Aug. 4, 1983 now abandoned.

BACKGROUND OF THE INVENTION

The invention relates to a novel apparatus including a new article of manufacture embodying a glass surface having a raised optical pattern, especially an array of spherical microlenses, integral therewith. By properly proportioning the optics of the array, a 1:1 erect conjugate image may be produced, thereby making the device particularly applicable to compact photocopiers.

Lenticular elements have been molded on both glass and plastic surfaces for various purposes. Thus, such elements perform a light focusing or controlling function in the panels or faces of light integrators and light refractors. They may also function primarily to scatter ambient light, as in projection screens and in cathode ray tubes.

Optic devices, such as just described, tend to exert a single optic effect, e.g., refracting or bending light rays which strike the element. The devices embody no imaging capability or concept. In general, the molded elements are rather large. Further, they do not normally require critical attention to precise accuracy such as required for image transmission in a photocopier for example.

Recently, it has been proposed to produce a strip lens array by molding a plurality of tiny microlenses on a plastic surface. The microlenses would be molded in rows and columns on two parallel plastic lens plates. With proper attention to spacing, lens size and other factors, a very compact and efficient imaging device could be produced.

As used herein, the term "array" refers to arrangements of lenses in a pattern regardless of the number of rows and/or columns involved. A single row may be referred to as either a "linear array" or a "strip lens".

If lens arrays are to be used for imaging purposes, it becomes necessary to isolate light channels between opposed lenses and thereby eliminate "crosstalk". This poses a serious problem in an integrally molded device.

The possibility of creating a strip lens by grinding and polishing individual glass or plastic rods has been recognized. The individual cylinders would then be arranged in a pattern and bonded in a fixed relation. However, the extreme problems of production and alignment have also been recognized.

Accordingly, a currently commercial imaging device relies on optical effects generated by an array of minute areas and/or rods, each having a defined gradient refractive index distribution. The array is produced by bundling a configuration of optical fibers wherein each fiber has a defined gradient index distribution imparted thereto as by ion exchange or material impregnation.

PRIOR LITERATURE

U.S. Pat. No. 4,168,900 (Adachi) describes an erect optical imaging system for copying apparatus comprising a first pair of array sets of object lenses and a second pair of array sets of relay lenses spaced from and aligned with the first pair, the first pair producing a real image and the second set producing an erect image. In each pair, one array is offset relative to the other. The lenses are square bars of glass or plastic that are 2 mm on a side.

U.S. Pat. No. 3,605,593, reissued as U.S. Pat. No. Re. 28,162, (Anderson) discloses an optical imaging apparatus embodying a pair of mosaics having lens arrays which image small portions of an object into a larger composite image.

Such an apparatus is further discussed by Anderson in an article entitled, "Close-Up Imaging of Documents and Displays with Lens Arrays", in the Feb. 15, 1979 issue of *Applied Optics*, Vol. 18, No. 4.

U.S. Pat. No. 3,544,190 (Moorhusen) also discloses an apparatus for forming a continuous image from an object at 1:1 magnification. A lens strip optical imaging system in this apparatus has a series of individual optical imaging devices with an internal field stop. The lens strips are molded in plastic.

U.S. Pat. No. 2,358,070 (Holmes) discloses a projection screen for displaying optical images. The screen comprises a light transmitting support having a plurality of lenticular elements on one surface for focusing light. A light absorbing layer on the opposite surface has exit pupils to permit passage of focused light.

U.S. Pat. No. 2,670,279 (Szegho et al.) and U.S. Pat. No. 3,114,668 (Guiles) describe, respectively, a sand blasting and a droplet coating method of producing an array of elements to reduce specular reflection on a cathode ray tube panel.

U.S. Pat. No. 2,628,160 (Stookey) reviews several prior patents disclosing photosensitively opacifiable glasses and describes selectively sculpturing or etching such glasses due to differential etching rates for clear and crystallized glass.

U.S. Pat. No. 3,931,438 (Beall et al.) discloses a laminated article formed with one lamina being a surface layer and the other an interior core. The two laminae are similar chemically and close in coefficient of thermal expansion, but densify to different degrees on cooling, thereby setting up compressive stresses.

U.S. Pat. No. 3,719,462 (Andreatch, Jr. et al.) discloses a means of producing light guide paths in glass by mechanically stressing or densifying the desired path.

PURPOSES OF THE INVENTION

One purpose is to provide an optical apparatus for focusing an image of an object comprising an optical device embodying a raised optical pattern on its surface.

Another purpose is to provide such an apparatus wherein the device has a pattern formed integrally with a glass surface which pattern forms a smooth, unbroken, curved surface with the glass surface.

A further purpose is to provide such an apparatus wherein the pattern in the device comprises an array of raised elements.

Another purpose is to provide such an apparatus utilizing an array of microlenses integral with a glass surface.

A further purpose is to provide such an apparatus having an optical imaging device comprising an array of microlenses that is not restricted to one or two linear rows.

Another purpose is to provide such an apparatus wherein the optical imaging device comprises one integral glass body having opposed arrays of microlenses in registry and having transparent light paths therebetween.

A further purpose is to provide such an apparatus utilizing an integral lens array embodying means for optically isolating each lens system and preventing "crosstalk".

Another purpose is to provide a method for focusing at least one image of an object on a receiving surface which comprises interposing an optical imaging device between the object and the surface, said optical imaging device comprising a glass body at least a portion of which is a photonucleated opacified glass, said body having opposed surfaces, at least one of the surfaces having raised light focusing transparent optical pattern portions integral therewith, and transparent channels connecting said raised pattern portions to the surface opposed to the surface containing said pattern.

A particular purpose is to provide an optical apparatus having an optical imaging device that is small, compact and simple to produce.

Another purpose is to provide an optical apparatus having an optic imaging device that employs less glass bulk, and hence enables more compact copiers and similar imaging devices.

A further purpose is to approximate more closely uniformity of illumination in a lens array imaging device.

A further purpose is to form multiple images from an object.

It is a specific purpose to provide an optical apparatus employing an optic imaging device capable of forming a 1:1 erect conjugate image.

A further purpose is to provide a method for focusing at least one image of an object on a receiving surface which comprises interposing an optical imaging device between the object and the receiving surface, said optical imaging device comprising at least one glass body having opposed device surfaces, at least one of such device surfaces having an array of spherical microlenses rising above and integral with the device surface, each such microlens being closely and uniformly spaced from adjacent microlenses, and internal clear parallel light transmitting channels connecting each lens to the opposing surface and a photonucleated opaque matrix between the channels.

Other purposes and benefits will become apparent as the invention is hereafter described and defined.

SUMMARY OF THE INVENTION

In its broadest aspect, the invention comprises an optical apparatus for focusing at least one image and optionally only one image of an object, said apparatus comprising a receiving surface and an optical imaging device between the image and the object to form an image of the object on the receiving surface. The imaging device comprising at least one glass body, at least a portion of which is a photonucleated opacified glass. The body has opposed surfaces, at least one of the surfaces having raised light focusing transparent optical pattern portions integral therewith and transparent channels connecting the raised transparent pattern portions to the surface opposed to the surface containing the pattern.

The invention further comprises a method for focusing an image of an object on a receiving surface which comprises interposing an optical imaging device between the object and the surface, said optical imaging device comprising a glass body at least a portion of which is a photonucleated opacified glass, said body having opposed surfaces, at least one of the surfaces having light focusing raised transparent optical pattern portions integral therewith, and transparent channels connecting said raised pattern portions to the surface opposed to the surface containing said pattern.

Even more specifically, the invention includes a method for focusing an image of an object on a receiving surface which comprises interposing an optical imaging device between the object and the receiving surface. The optical imaging device comprises at least one glass body having opposed device surfaces, at least one of such device surfaces having an array of spherical microlenses rising above and integral with the device surface. Each such microlens is closely and uniformly spaced from adjacent microlenses. Internal clear parallel light transmitting channels connect each lens to the opposing surface and a photonucleated opaque matrix is between the channels.

In preferred embodiments lenses are on both surfaces and the microlenses have a diameter of at least 100 microns, preferably 300 microns. Lens shapes, distances and materials may be selected so that a 1:1 conjugate image is formed at the receiving surface. In a formula for determining these relationships, the lens thickness T may be related to the lens radii of curvature $R_1$ and $R_2$, the refractive index $n_o$, the object working distance $X_1$ and the image working distance $X_2$ by the first order approximation formula:

$$T \text{ (thickness)} = \frac{n X_1 (R_1 + R_2)}{(n - 1)X_1 - R_1}$$

and $$X_1 R_2 = X_2 R_1$$

so that a 1:1 erect conjugate image is formed. The lenses on the first surface forms a demagnified relay image inside the clear area, which in effect becomes an object for the second surface lens.

DESCRIPTION OF THE DRAWINGS

In the accompanying drawings.

GENERAL DESCRIPTION

The present invention is based on observations regarding behavior of a photonucleable, opacifiable glass as such glass is opacified. It has been observed that the glass undergoes densification during thermal opacification. More importantly, it has been observed that, when such a glass body is selectively exposed to activating, short wavelength radiation, the exposed portions tend to densify while the unexposed portions do not. Hence, the exposed regions undergo shrinkage. This exerts a radial compressive force on the unexposed regions of soft glass thereby drawing them into a raised pattern with a smooth curved surface. The raised pattern will assume a condition of minimum energy whereby, for example, a circular unexposed region will be drawn into a spherical shape due to surface tension.

These observations led to the perception that a raised optical pattern could be formed in a glass surface by controlled, selective exposure of an opacifiable glass. The pattern may take any desired geometrical form, but is described in terms of microlens arrays because of commercial interest therein. The lenses that may be formed are extremely small in size. For example, in a typical array, where each lens has a 200 micron diameter and adjacent lenses are on 300 micron centers or axes, a two (2) inch square glass surface may be 28,900 microlenses formed thereon.

Figure 1:
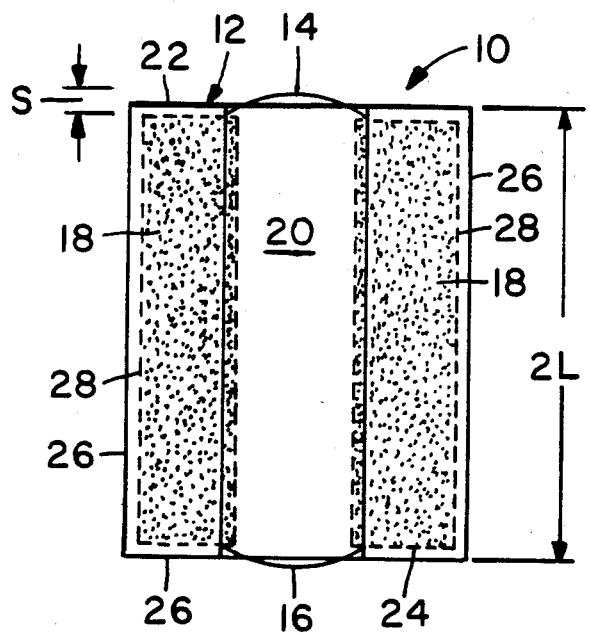
FIG. 1 schematically illustrates a lens system formed in glass by selective densification in accordance with the invention.

Such pattern development is schematically illustrated in FIG. 1 which shows a single lens system 12 formed in a flat strip 10 of photonucleable, opacifiable glass. Lens system 12 embodies spherical microlenses 14 and 16 which form as raised optical elements on opposite surfaces of glass body 10. The microlens pattern forms as zone 18 of the glass contracts due to differential densification between the opacified zone 18 and the clear zone constituting lens system 12.

Lens system 12 consists of a clear, light-transmitting transparent channel in the form of cylindrical zone 20 and microlenses 14 and 16 on the respective surfaces 22 and 24 of the glass body. Zone 20 is surrounded by, and optically insulated by, continuous matrix 18 which is opacified. Thus, matrix 18 has been exposed to radiation which nucleated the glass and permitted crystal growth on heat treatment. Coincident with the crystal growth, the glass became denser and shrank below the level of the unexposed, and hence unopacified, cylindrical zone 20.

In FIG. 1, solid lines 26 indicate original glass boundaries; whereas, dotted lines 28 indicate the corresponding boundaries after densification. In dimensional markings, S is the lens height, that is the extent to which the lens extends above matrix 18; 2T is the glass thickness or length of cylindrical zone 20 between microlenses 14 and 16; D is the lens diameter.

These values are related in this manner:

$$S/T = \tfrac{3}{8}(1 - \rho_o/\rho_f)$$

where $\rho_o$ is original glass density and $\rho_f$ is the final or opacified glass density. The radius of curvature of a lens is given by:

$$R \approx D^2/8S$$

The arrangement illustrated in FIG. 1 is particularly beneficial where the optical pattern forms an array of lens systems. Then, the opacification of zone 18 not only causes formation of the lenses 14 and 16; it also provides the opaque separators or barriers vital to preventing "crosstalk" between lens systems in an array.

As noted earlier, a particular utility for lens arrays is in an optical imaging device such as used in photocopiers. Such lens arrays may, however, be advantageously used in many other types of optical apparatus for focusing an image of an object upon a receiving surface.

The receiving surface may be planar or curvilinear or even another imaging system which picks up the image in space or at the surface of the additional imaging system. The receiving surface may, for example, be a xerographic drum or an array of photodetectors.

The object may be a three dimensional object, but is usually a two dimensional object on a planar or curvilinear surface. The object, for example, may be a paper surface, the image on a CRT or an LED or LCD display.

A lens array for use in the method and apparatus in accordance with the present invention provides several important advantages for this purpose. One such advantage is that the number of lenses that can be produced in one simple operation is practically limitless. Further, the lenses can be made very small, while still retaining a high degree of uniformity. The lens array may be planar or may be appropriately curved to form an image of the object surface on the receiving surface either of which may also be curved.

The importance of minimizing lens size may be seen from the fact that the power of the lens is given by the expression $R/n - 1$ where R is the radius of curvature of the lens. This is directly related to the square of the lens diameter by the expression $$D^2(n-1)/R$$

where D is the lens diameter and the expression is a constant. Therefore, it is frequently desirable to minimize the lens diameter. Such reduction is important in economically reducing the size of imaging devices and apparatus such as photocopiers. Currently, mirror systems are frequently used to accommodate long light paths in small space. These add to both the complexity and the cost of the apparatus.

Another factor of considerable concern is uniformity of illumination. This is another area where the flexibility in the rows and columns of an array can provide superior results to a device limited to one or two linear arrays.

Lens height is dependent on degree of exposure of the glass to short wavelength radiation and to subsequent thermal treatment. Where the glass is exposed on one surface only, the lens height on the opposite unexposed surface may be essentially the same as that on the exposed surface in a thin glass sample. As thickness increases above about two mm a differential tends to occur and to become greater with thickness. In any event, the lens height does not usually exceed about 40 microns, much less than the lens diameter. The thickness of the lens array including underlying glass (imaging device) is thus usually between 0.5 and 10 millimeters.

It is possible to maintain essential equal lens height in glass of greater thickness if one exposes the glass sample from both faces. The respective masks and equipment must be arranged in very close registry. Then each side is given an equal degree of exposure.

As indicated, it is usually desirable to maintain as small a lens diameter as possible, consistent with other requirements. However, accuracy and uniformity of both lens curvature and lens size become increasingly difficult to maintain as size is decreased. Hence, a diameter of about 100 microns is a practical minimum and a diameter of about 300 microns is preferred. The upper limit on size is governed primarily by the optics requirements in any given situation. Normally, about 500 microns is a practical upper limit, although larger lenses can readily be produced. The distance between lens peripheries is usually between 40 and 250 microns.

Figure 2:
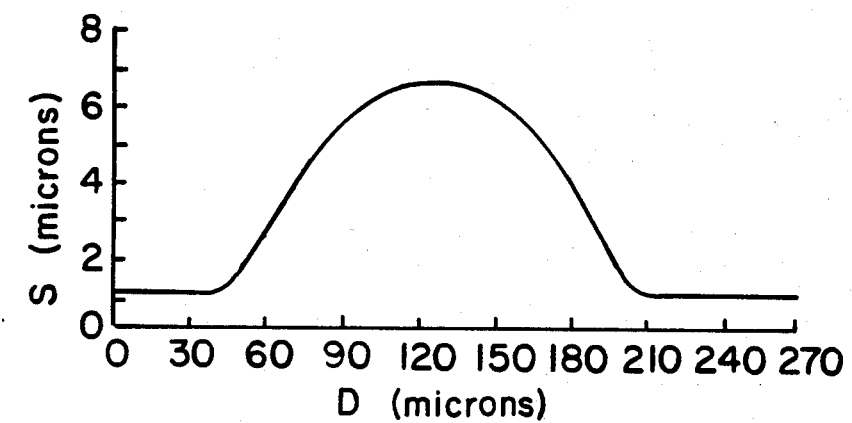
FIG. 2 is a magnified surface profile trace of a typical microlens in accordance with the invention.

FIG. 2 of the drawing shows a magnified surface profile trace of a single microlens in a lens array. In addition to overall magnification, the height and breadth are exaggerated relative to each other for illustration purposes. Thus, in the graphical illustration, units along the horizontal axis equal 30 microns, whereas units along the vertical axis are in microns. Thus, the lens may be considered as greatly condensed laterally, or greatly expanded vertically, to show the shape and spacing.

Thus far, the imaging device has been considered only in terms of a single pattern or array of spheres formed on and integral with a glass surface. For image transmitting purposes, however, the device may be considered as an array of lens systems constituted by elongated transparent (light transmitting) channels, usually cylinders, extending through a glass body between microlenses on opposite surfaces.

As mentioned earlier, a particular application utilizes the fact that a 1:1 erect conjugate image can be transmitted by controlling the optic characteristics of the device. This is illustrated schematically in FIGS. 3, 4 and 5.

As illustrated in FIG. 1, lenses 14 and 16 are formed on the front and back surfaces, respectively, of glass plate 10. The two surfaces may exhibit equal power lenses, but will usually differ, especially if initial exposure is directed to one side of glass plate 10. The possibility of having one-to-one erect imaging depends on the radius of curvature of the front and back lenses, and on the separation between the lens arrays.

Figure 3:
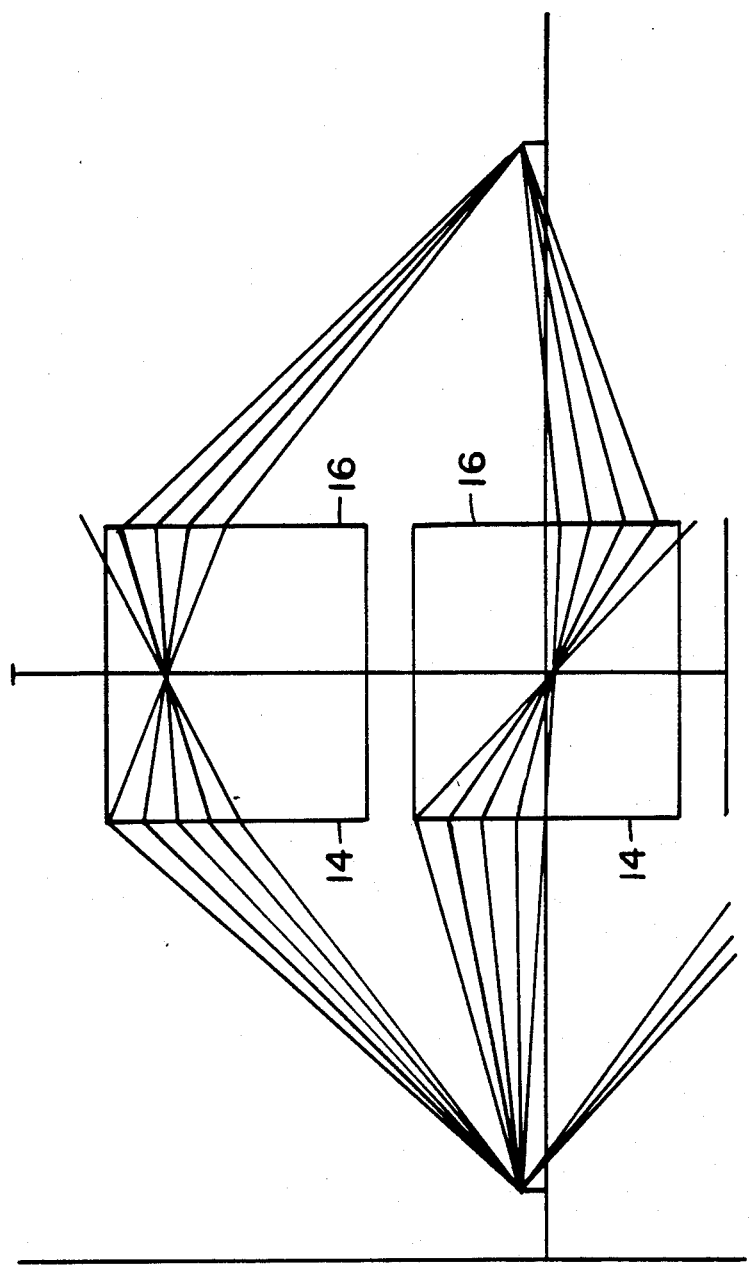
FIG. 3 is an enlarged view in cross-section illustrating selected light paths in an imaging device having equal power surfaces and transmitting a 1:1 conjugate image.
Figure 4:
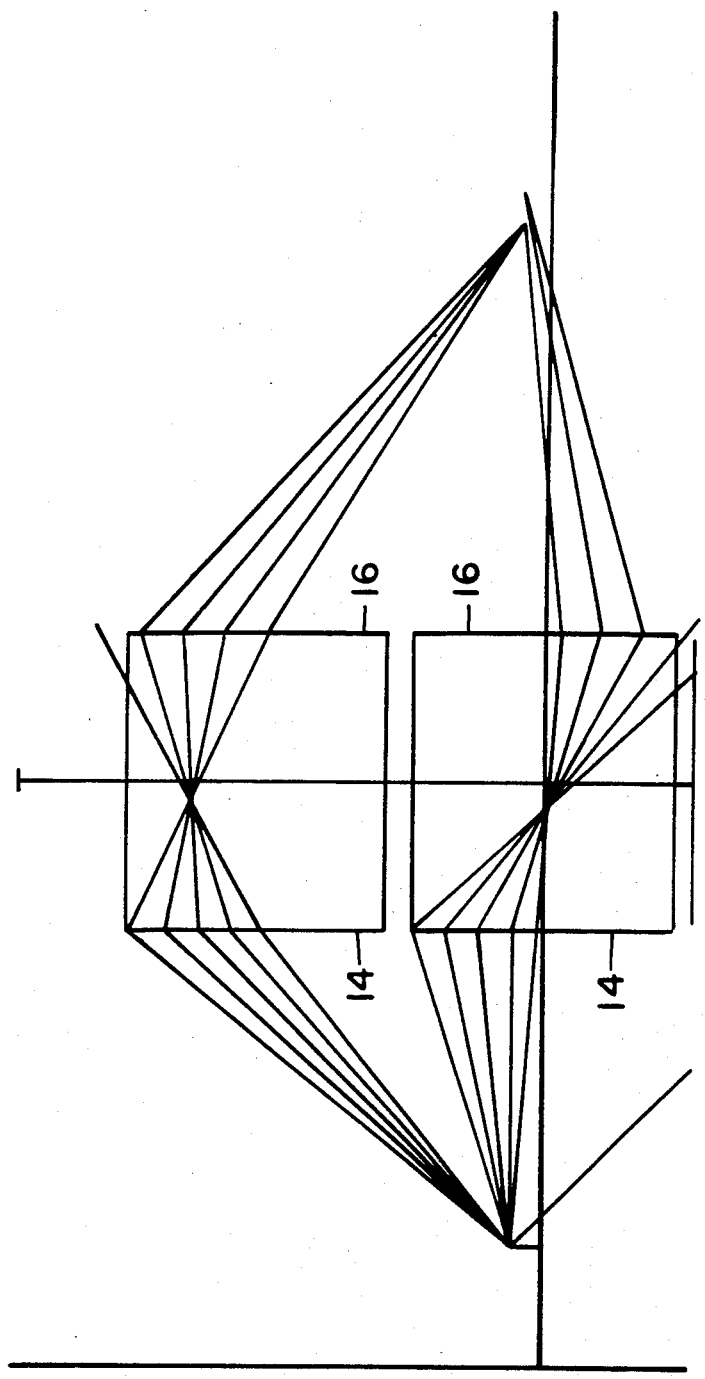
FIG. 4 is similar to FIG. 3, except that the device has unequal power surfaces.

In a single piece device having equal power surfaces, such as schematically shown in FIG. 3, one may formulate an approximate relationship for conjugate imaging as $$T = \frac{2n_o X_o}{n_o - 1} \frac{R}{X_o - R/(n-1)}$$

where
R = radius of curvature of the lens
$n_o$ = glass index of refraction
T = thickness of the imaging device
X = image distance A similar relationship may be developed for the situation where a single piece device has different power surfaces. This situation is illustrated in FIG. 4. The corresponding formula for conjugate imaging here is $$T \text{ (thickness)} = \frac{n X_1 (R_1 + R_2)}{(n-1)X_1 - R_1}$$

and $$X_1 R_2 = X_2 R_1$$

A single piece imaging device, such as illustrated in FIGS. 3 and 4 is a preferred form because of simplicity of production. However, unless one employs a dual exposure system as noted earlier, this requires exposure through the body by the activating radiation. In turn, that tends to limit the thickness of the glass body employed.

Figure 5:
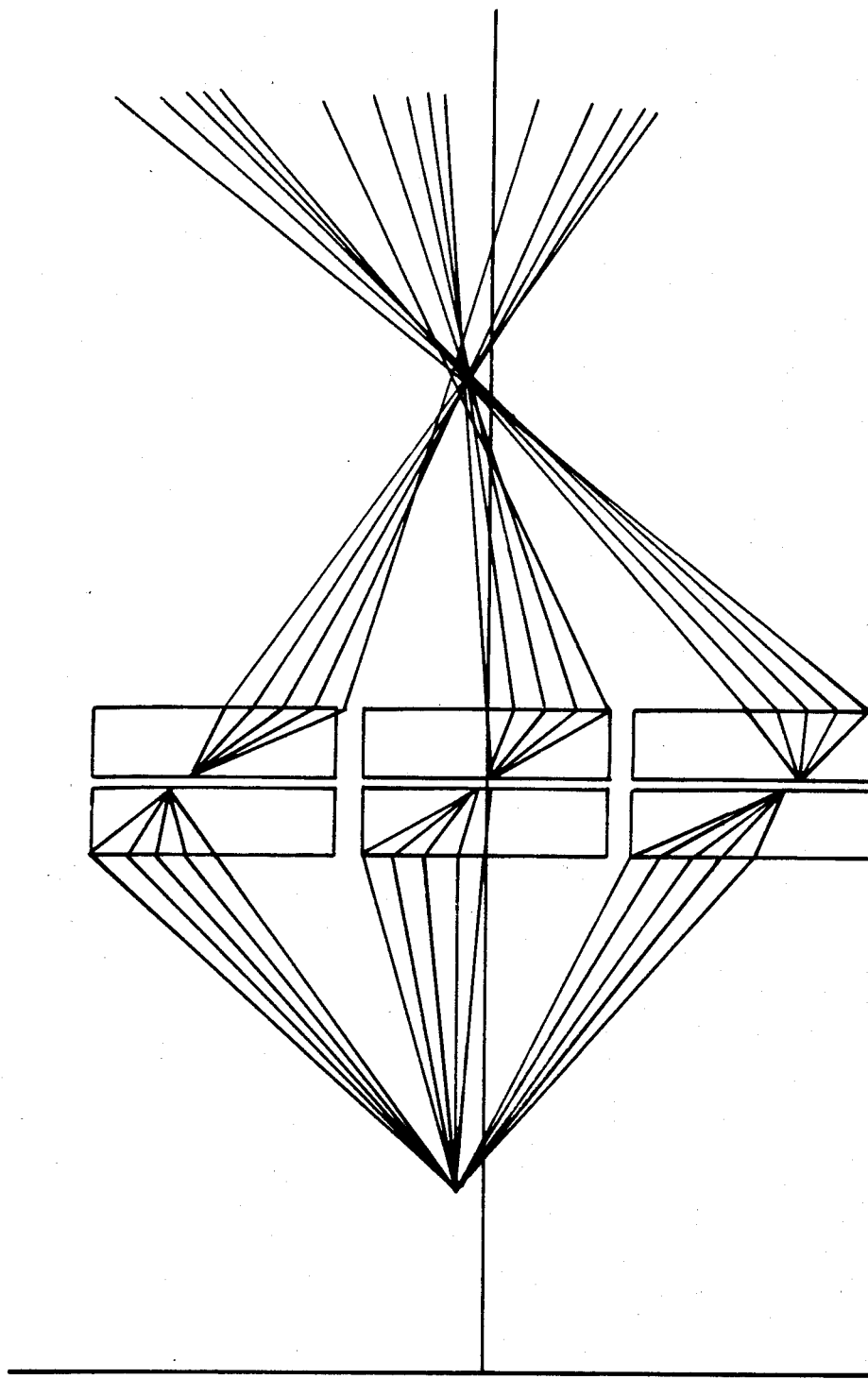
FIG. 5 is similar to FIGS. 3 and 4, but illustrates two devices in tandem with interior field lenses.

This situation can be resolved by forming individual devices and then stacking these to achieve the desired device thickness. Such an arrangement of two devices is schematically illustrated in FIG. 5 wherein designations of dimensions correspond to FIGS. 3 and 4.

In preparing such a composite device, the individual bodies are first developed as single piece devices. That is to say the glass bodies are selectively exposed through a multi-aperture mask and heat treated to differentially densify the body and develop the microlens pattern. The single piece bodies are then placed in registry and corresponding lens systems accurately aligned as by maximum light intensity equipment.

It is recognized that a preferred condition is to have lenses of equal power on both the entrance and exit side of a system. It is also customary to expose a glass body from one surface only, this being known as the "front surface". In a dual stack then, for example, we arrange the bodies so that both outward facing, or exposed, surfaces are "front surfaces."

It will be appreciated that the microlenses on the outside surfaces are the only ones that are directly involved in imaging. The inside, or facing, lenses serve no direct function and could be removed if desired. They may, however, serve indirect purposes, and we prefer to leave them on the devices.

One very significant function served by the inside lenses is that of a field lens. Light rays, which are at such an angle as to otherwise be lost, may be bent back by these interior lenses as illustrated in FIG. 5. Thus, the lowest, or outside ray in each group of traces might be lost, except for the indicated field effect. This provides improved brightness.

It is of course necessary to align the two or more devices. However, light beam equipment is available which adjusts such devices to a maximum transmission value and then locks them in position for sealing or other unification procedure.

Accuracy of spacing and centering the microlenses in an array, as well as in maintaining their spherical surface, is extremely important in order to obtain a clear, undistorted image. The literature has noted the great skill and long and troublesome labor required to obtain microlenses by grinding and polishing, as well as subsequent alignment.

The present invention provides a simple, inexpensive procedure for producing the desired integral lens array. Basically, the inventive method utilizes a physical phenomenon observed to occur when a photosensitively opacifiable glass is selectively opacified.

Stookey observed, and his U.S. Pat. No. 2,628,160 was based on such observation, that the opacified and clear areas in a selectively opacified photosensitive glass are rendered differentially etchable, whereby filigrees and other etched patterns are produced. It has now been observed that differential densification of the glass occurs during the photosensitizing and crystal-forming process. Thus, the crystal-containing areas tend to contract and become denser. The crystal-free areas do not undergo change, and hence do not contract. The result is a potential for producing an optical pattern in a glass surface by controlled formation of a physically raised pattern having an unbroken surface.

We have now found that the nature of this relief image may be controlled by controlling the initial radiation exposure of the glass. More specifically, we employ an otherwise transparent mask having a pattern of opaque dots corresponding to a desired lens array. Thus, the mask is transparent to the activating actinic radiation, except for the pattern of opaque dots.

When the glass is exposed through such mask, the exposed zones become nucleated. Meanwhile, the cylindrical zones under the opaque dots remain unexposed, and hence unnucleated. The glass is then heat treated in the usual manner to cause crystal growth in the exposed areas. This causes the exposed glass to contract and draw away from the uncrystallized cylindrical zones. Surface tension causes the transparent protrusions to assume spherical shapes and to appear as raised spherical surfaces with interstitial valleys.

Any photosensitively opacifiable glass may be employed. Included are the several glass composition families discussed in the Stookey patent, and that patent is incorporated herein for its teaching. The crystal phases are lithium disilicate and metasilicate, barium disilicate and alkali metal fluoride. The lithium silicate glasses are commercially available and provide a substantial crystal formation. Hence, they have been primarily used in the studies hereafter reported.

Specific examples of how imaging devices of the present invention may be prepared are as follows:

A photosensitively opacifiable glass, available from Corning Glass Works under Code No. 8603, was employed in the studies here described. This glass has the following composition as calculated in parts by weight on an oxide basis:

$SiO_2$: 79.1
$Li_2O$: 9.4
$Na_2O$: 1.6
$K_2O$: 4.2
$Al_2O_3$: 4.2
$ZnO$: 1.0
$Sb_2O_3$: 0.4
$Au$: 0.0012
$Ag$: 0.115
$CeO_2$: 0.015
$SnO$: 0.003

Three (3) 2"×6" strips of this glass were cut from a rolled sheet 1.5 mm in thickness. Additional strips of varying thickness were cut from other rolled sheets.

Figure 6:
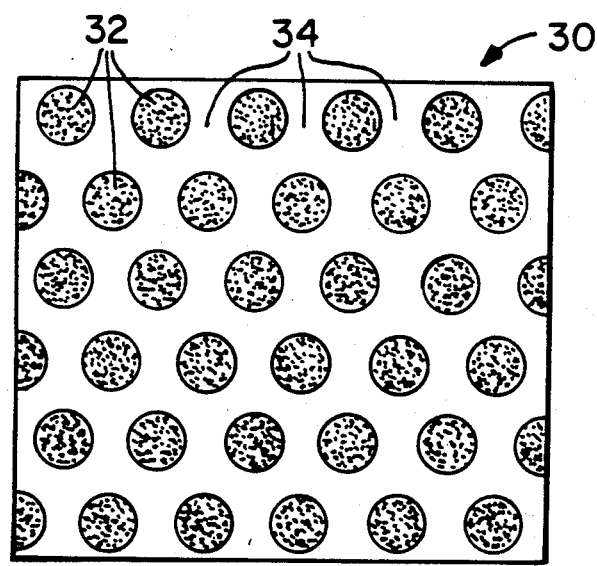
FIG. 6 is a magnified top view of a mask having a negative dot pattern.

One face of each strip was covered with a mask having a negative dot pattern as shown in exaggerated dimensions in FIG. 6. Having reference to FIG. 6, mask 30 has an array of dots 32 that are uniform in size and in spacing. These dots are opaque to actinic radiation such as emitted by a mercury arc lamp. Portions 34 of mask 30, intermediate dots 32, are essentially transparent to the radiation.

Three masks were provided, each with opaque dots differing in size from the others. Thus, the diameters of dots 32 were, respectively, 150, 200 and 300 microns. Each masked glass sample was exposed through its mask to radiation from a Hanovia 435 watt mercury arc lamp positioned about 15 inches from the masked glass. Exposure time was 100 seconds.

Subsequent to exposure, the samples were heat treated between the annealing and softening temperatures of the glass in accordance with standard photosensitve glass processing practice. Thus the samples were heated to 540° C., held to permit nucleation, then heated to 580° C., and held to permit crystal growth.

Each of the samples was observed to have a series of spherical bumps or protrusions at both the exposed surface and the opposite surface. A surface profile trace, such as shown in FIG. 2, was made on each sample to demonstrate sphericity of the lens developed, as well as permit determination of dimensions. Optical studies showed the capability of the spherical bumps to act as microlenses, the quality depending on the spherical quality of the lens surface.

Measurements showed the lens height, resulting from the 100 second exposure, to be 8.6 microns. This value was obtained with each of the mask dot sizes. A further set of samples was given identical treatment, except for a 75 second exposure. In this case, lens height was found to be 6.8 microns.

Density measurements show that the microlenses were formed at a density ratio of about 1.01. Thus, the clear, uncrystallized glass, as originally melted and as found in the image-transmitting, cylindrical channels, had a density of 2.36. After exposure and heat treatment, the crystallized glass had a density of 2.38.

It has been previously stated that lens power, as measured by the lens radius of curvature, depends on lens diameter and on glass thickness. The heat treatment employed for crystallization may also influence the value.

To illustrate various influences on this value, variations were made in heat treatment following exposure, in glass (and hence lens system) thickness, and in lens diameter as determined by dot size in the masks employed. The data for these determinations are shown in the TABLE below.

Throughout the TABLE, the radius of curvature (R) in each case is given in mm for both the front and back surface lens elements. Exposure was from the front surface, and was held constant. Heat treatment is shown in degrees C./minutes hold. Sample thickness is in mm and the lens diameter in microns. In the heat treatment set of samples, lens diameter, as determined by mask dot size, was 300 microns; in the thickness variations, a 200 micron diameter dot size was employed in each case. In the heat treatment set of samples, glass thickness was 2 mm, while 3 mm thick glass was used in the samples where lens diameter was varied.

TABLE

| R (mm) | | |
|---|---|---|
| Front | Back | |
| | | Heat Treatment |
| 1.1 | 2.0 | 570° C./60' |
| 0.95 | 1.75 | 580° C./60' |
| 0.75 | 0.85 | 590° C./60' |
| | | Thickness |
| 0.4 | 0.7 | 2 mm |
| 0.37 | 0.7 | 3 mm |
| 0.33 | Infinite | 4 mm |
| | | Lens Diameter |
| 0.46 | 1.18 | 200 microns |
| 0.70 | 1.30 | 300 microns |
| 1.15 | 1.65 | 400 microns |
| 1.84 | 2.60 | 500 microns |

A particular feature of the present lens arrays is their ability to form a 1:1 erect conjugate image wherein each lens contributes light to a single image. The effect is schematically illustrated in FIGS. 3, 4 and 5.

The relationship between the lens array thickness, the radius of curvature of the lenses and the image-to-object distance has been found to be expressed by the formulae earlier set forth relative to FIGS. 3, 4 and 5 where X is the object distance, R is the radius of curvature and $n_o$ is the refractive index of the clear glass. One can then design any desired conjugate distance by suitably choosing the radius of curvature for the lens and the lens thickness. Radius of curvature is a function of and controlled by parameters as outlined above. Usually the image receiving surface is near the working distance from the imaging device, i.e. the distance from the lens surface to the place where the image if formed. The working distance is usually from 0.5 to 25 millimeters. The overall distance from the object to the receiving surface is usually from about 5 to about 50 mm.

As previously discussed, in accordance with the present invention a method and apparatus for focusing an image of an object on a receiving surface is provided.

Figure 8:
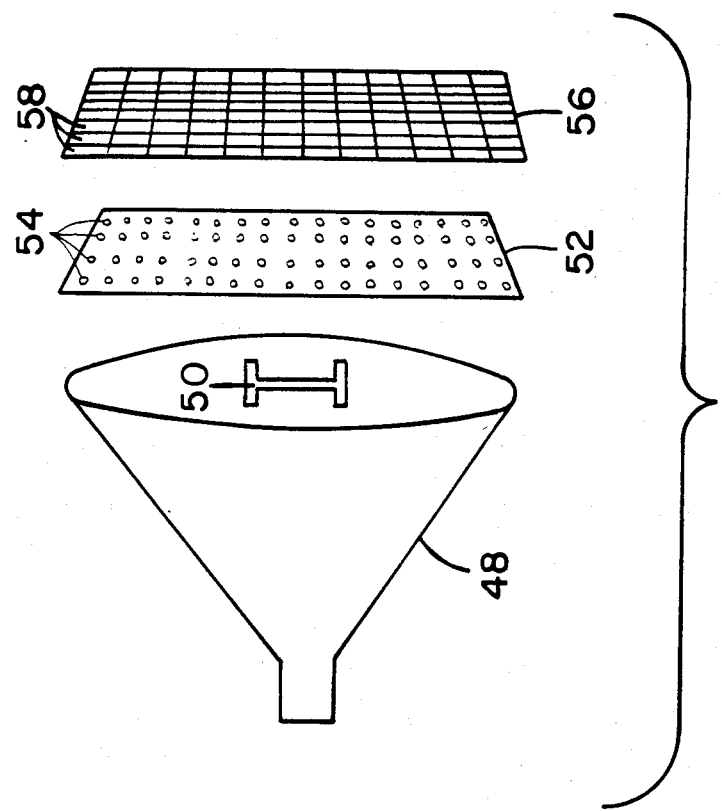
FIG. 8 is a schematic perspective view of a second embodiment of an optical apparatus of the present invention.
Figure 7:
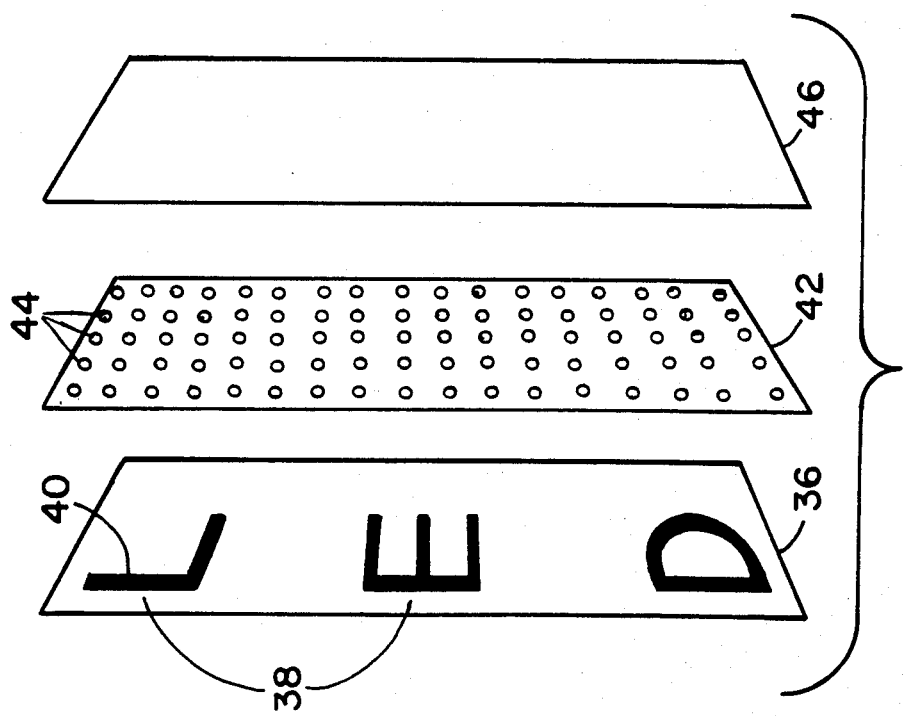
FIG. 7 is a schematic perspective view of an embodiment of an optical apparatus of the present invention.
Figure 9:
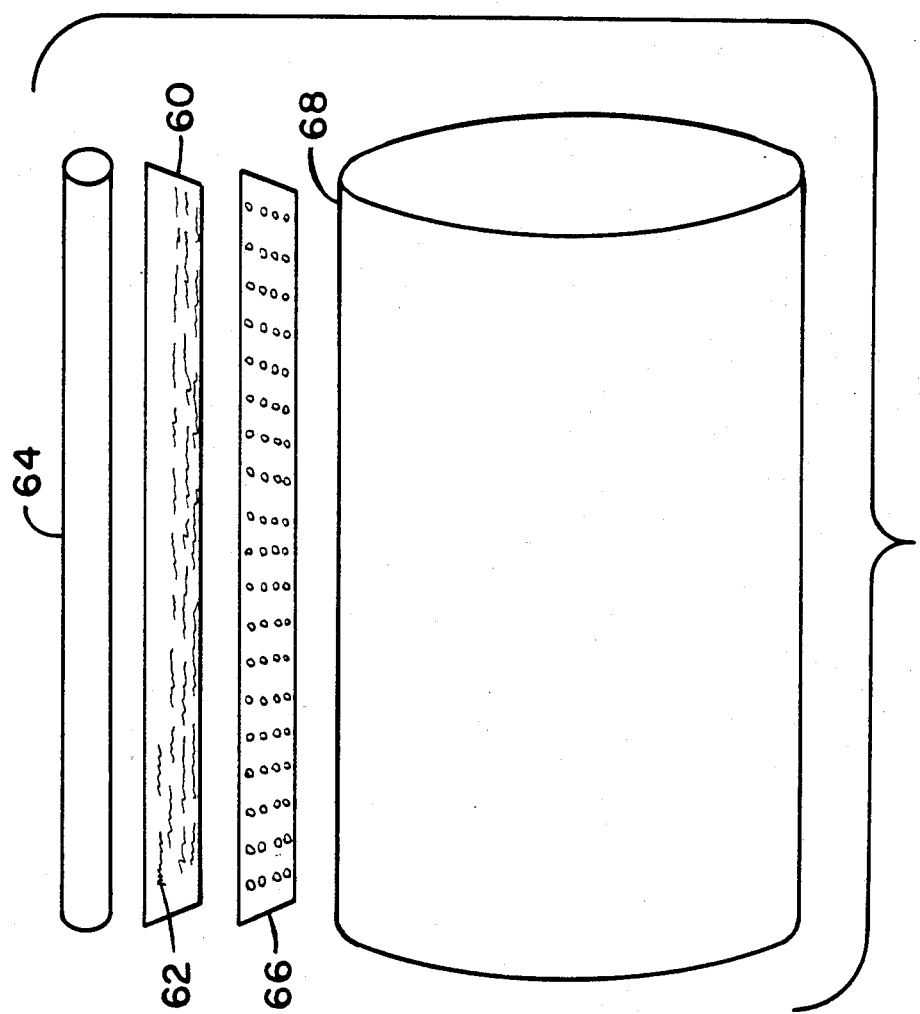
FIG. 9 is a schematic perspective view of a third embodiment of an optical apparatus of the present invention.

FIGS. 7 through 9 show various embodiments of the apparatus of the invention which apparatus is particularly suited to the practice of the method of the invention to focus an image of an object.

The apparatus comprises a receiving surface, and an optical imaging device between the object and the receiving surface. The receiving surface is any surface, plane or curved, upon which an image of the object is focused. The receiving surface is usually an array of photodetectors, or a xerographic drum, but may also be a photographic film or a transparent, reflective or translucent surface which may be a further optical system or which permits visual observation or electronic scanning.

The optical imaging device has been previously discussed in detail and comprises at least one glass body having opposed device surfaces. At least one of the surfaces has a raised transparent optical pattern portion which assists in collecting or focusing light. The raised optical pattern is usually an array of microlenses which usually have a surface which is a portion of a spherical surface area (spherical microlenses). Each of the microlenses is closely and uniformly spaced from adjacent microlenses. The device has internal transparent parallel light transmitting channels connecting each lens to the opposing device surface and has a photonucleated opaque intermediate matrix between the channels. The channels are usually cylindrical in shape. Where both of the opposed surfaces have lens arrays, the lens arrays are in register on the opposed device surfaces and the light transmitting channels connect pairs of opposing lenses.

FIG. 7 illustrates an embodiment of the apparatus of the present invention wherein an object 36 comprises a light emitting diode (LED) array 38 which is activated to provide the object shapes 40 to be transmitted. Imaging device 42 is provided which comprises an array of spherical microlenses 44. Device 42 collects, transmits and focuses light from shapes 40 upon receiving surface 46 which is a photographic film.

FIG. 8 illustrates an embodiment of the apparatus of the invention wherein the object comprises a cathode ray tube (CRT) 48 which is activated to provide an object shape 50 to be transmitted. Imaging device 52 is provided which is an array of spherical microlenses 54. Device 52 collects, transmits and focuses light from shape 50 upon receiving surface 56 which is an array of photodetectors 58.

FIG. 9 illustrates a further embodiment of the invention wherein object 60 comprises a sheet of paper containing object shapes 62 in the form of printed characters. A light source 64 is provided which back lights the paper to allow the characters to appear dark against a bright background. Imaging device 66 collects, transmits and focuses light from the background upon receiving surface 68 which is in the form of a xerographic drum.

Figure 10:
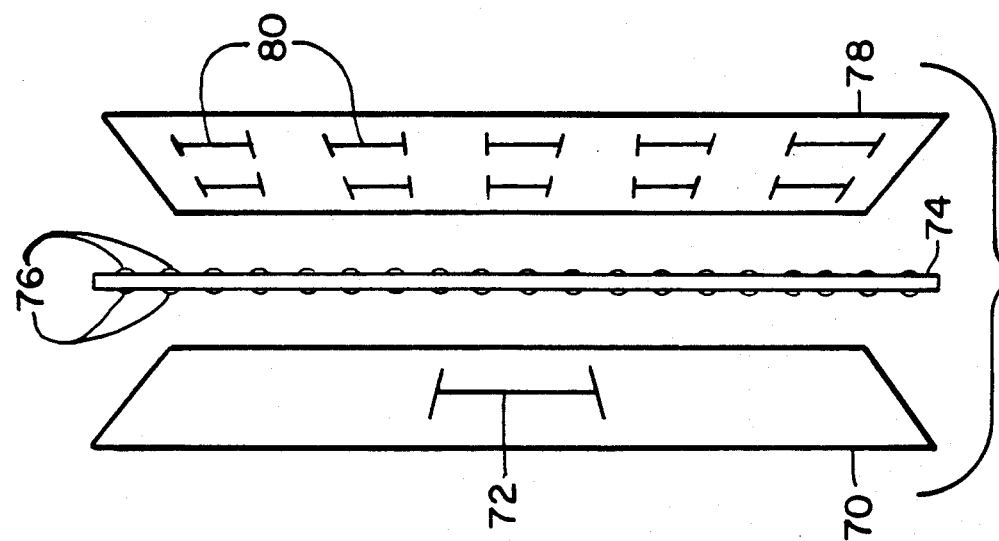
FIG. 10 is a side perspective view of a fourth embodiment of an optical apparatus of the present invention forming multiple images of an object.

FIG. 10 illustrates an embodiment wherein the characteristics of the lenses and the distances are appropriately selected so that multiple images are formed. In particular, light from object 70 having object shape 72 is focused by means of imaging device 74 having lenses 76 upon surface 78 to form multiple images 80. Such multiple images can be highly desirable, e.g. for forming three dimensional images and for forming repeating patterns. Repeating patterns are especially desirable when photoresists are being exposed to form etching patterns, e.g. for ornamental designs and electronic integrated circuits.

Appropriate spacing between the object, imaging device and receiving surface may be maintained by any suitable means, such as a frame, in these and other embodiments.

What is claimed is:

1. A method for focusing at least one image of an object on a receiving surface which comprises interposing an optical imaging device between the object and the surface to form an image of the object on the surface, said optical imaging device comprising a glass body at least a portion of which is a photonucleated opacified glass, said body having opposed surfaces, at least one of the surfaces having raised transparent light focusing optical pattern portions integral therewith, and transparent channels connecting said raised pattern portions to the surface opposed to the surface containing said pattern.

2. The method of claim 1 wherein the optical pattern is an array of spherical microlenses.

3. A method for focusing at least one image of an object on a receiving surface which comprises interposing an optical imaging device between the object and the receiving surface to form an image of the object on the receiving surface, said optical imaging device comprising at least one glass body having opposed device surfaces, at least one of such device surfaces having an array of spherical microlenses rising above and integral with the device surface, each such microlens being closely and uniformly spaced from adjacent microlenses, said internal clear parallel light transmitting channels connecting each lens to the opposing surface and a photonucleated opaque matrix between the lenses and channels.

4. The method of claim 3 wherein both of the opposed surfaces have lens arrays, said lens arrays being in register on the opposite device surfaces, said light transmitting channels connecting pairs of opposing lenses.

5. The method of claim 4 wherein the microlenses have a diameter of between about 100 and about 500 microns.

6. The method of claim 5 wherein lens shapes, distances and materials are selected so that a 1:1 conjugate image is formed at the receiving surface.

7. The method of claim 6 wherein the overall lens thickness (T) is related to the radius of the curvature of the lens (R), the image object distance (X) and the refractive index $n_o$, by the formula $$T = \frac{2n_o X}{n_o - 1} \cdot \frac{R}{X_o - R/(n_o - 1)}$$

whereby, by appropriate selection of T, R, X and $n_o$, said one to one conjugate image of the object may be formed upon said surface.

8. The method of claim 4 wherein the optical imaging device comprises two of said bodies, said bodies being rigidly maintained in a stacked relationship such that each lens system in one body is in registry with a corresponding lens system in the adjacent body, whereby the device has the effective thickness for imaging purposes of both bodies.

9. The method of claim 3 wherein multiple images are formed from an object.

10. The method of claim 3 wherein the object is a surface containing two dimensional representations.

11. The method of claim 10 wherein the object is a paper surface.

12. The method of claim 11 wherein the receiving paper surface is illuminated by light passing through the paper.

13. The method of claim 10 wherein the object is a cathode ray tube phosphorescent surface.

14. The method of claim 10 wherein the object is an LED or LCD display.

15. The method of claim 3 wherein the receiving surface is a xerographic drum.

16. The method of claim 3 wherein the receiving surface comprises an array of photodetectors.

17. The method of claim 16 wherein the receiving photodetectors are charge coupled detectors.

18. The method of claim 3 wherein the receiving surface is a photographic film.

19. An optical apparatus for focusing at least one image of an object, said apparatus comprising:
  (a) a receiving surface; and
  (b) an optical imaging device between the image and the object to form an image of the object on the receiving surface;
said imaging device comprising at least one glass body, at least a portion of which is a photonucleated opacified glass, said body having opposed surfaces, at least one of the surfaces having raised light focusing transparent optical pattern portions integral therewith and transparent channels connecting the raised transparent pattern portions to the surface opposed to the surface containing the pattern.

20. The apparatus of claim 19 wherein the optical pattern is an array of spherical microlenses.

21. The apparatus of claim 20 wherein the receiving surface is proximate the working distance from the imaging device which is between 0.5 and 2.5 millimeters.

22. An optical apparatus for focusing at least one image of an object, said apparatus comprising:
  (a) a receiving surface; and
  (b) an optical imaging device between the image and the object to form an image of the object on the receiving surface;
said optical imaging device comprising at least one glass body having opposed device surfaces, at least one of such device surfaces having an array of microlenses rising above and integral with the device surface, each such microlens being closely and uniformly spaced from adjacent microlenses, internal transparent parallel light transmitting channels connecting each lens to the opposing device surface and a photonucleated opaque intermediate matrix between the channels.

23. The apparatus of claim 22 wherein the microlenses are arranged to form multiple images of an object.

24. The optical apparatus of claim 22 wherein both of the opposed surfaces have lens arrays, said lens arrays being in register on the opposed device surfaces, said light transmitting channels connecting pairs of opposing lenses.

25. The apparatus of claim 24 wherein the optical imaging device comprises two of said bodies, said bodies being maintained in a stacked relationship such that each lens system in one body is in registry with a corresponding lens system in the adjacent body, whereby the device has the effective thickness for imaging purposes of both bodies.

26. The apparatus of claim 24 wherein the microlenses have a diameter of between about 100 and about 500 microns.

27. The apparatus of claim 26 wherein the distance between lens peripheries is between 40 and 250 microns.

28. The apparatus of claim 24 wherein the distance between the receiving surface and the object is from 5 to 50 millimeters.

29. The apparatus of claim 28 wherein the receiving surface is proximate the working distance from the imaging device which is between 0.5 and 25 millimeters.

30. The apparatus of claim 28 wherein the imaging device is from 0.5 to 5 millimeters thick.

31. The apparatus of claim 24 wherein the receiving surface is proximate the working distance from the imaging device which is between 0.5 and 2.5 millimeters.

32. The apparatus of claim 24 wherein the imaging device is from 0.5 to 5 millimeters thick.

33. The apparatus of claim 32 wherein the receiving surface is proximate the working distance from the imaging device which is between 0.5 and 2.5 millimeters.

34. The apparatus of claim 24 wherein lens shapes, distances and materials are selected so that a 1:1 conjugate image is formed at the receiving surface.

35. The apparatus of claim 34 wherein the overall lens thickness (T) is related to the radius of curvature of the lens (R), the image object distance (X) and the refractive index $n_o$, by the formula:

$$T = \frac{2n_o X}{n_o - 1} \cdot \frac{R}{X - R/(n_o - 1)}$$

whereby, by appropriate selection of T, R, X and $n_o$, said one to one conjugate image of the object may be formed upon said receiving surface.

36. The apparatus of claim 32 wherein the receiving surface is proximate the working distance from the imaging device which is between 0.5 and 2.5 millimeters.

37. The apparatus of claim 2 wherein the object is a surface containing two dimensional representations.

38. The apparatus of claim 37 wherein the object is a paper surface.

39. The apparatus of claim 37 wherein the object is an LED or LCD display.

40. The apparatus of claim 37 wherein the receiving surface is a xerographic device.

41. The apparatus of claim 37 wherein the receiving surface comprises an array of photodetectors.

* * * * *